Dec. 27, 1932.  C. L. TYLER  1,892,022
PISTON FOR SLUSH PUMPS AND THE LIKE
Filed Nov. 20, 1930
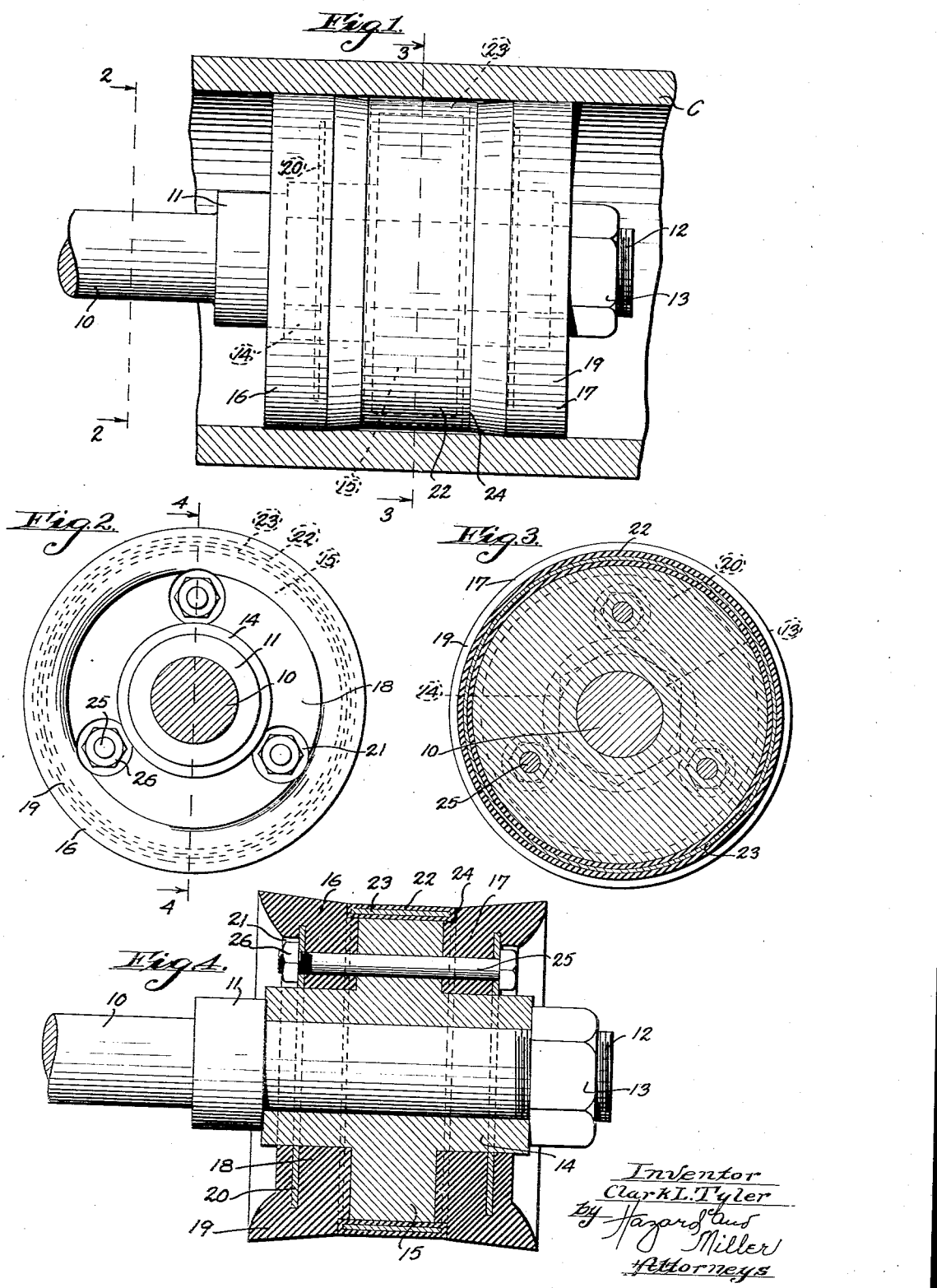

Patented Dec. 27, 1932

1,892,022

UNITED STATES PATENT OFFICE

CLARK L. TYLER, OF TORRANCE, CALIFORNIA

PISTON FOR SLUSH PUMPS AND THE LIKE

Application filed November 20, 1930. Serial No. 496,935.

This invention relates to improvements in pistons for slush pumps and the like.

An object of the invention is to provide a novel, simple and durable piston construction employing cup washers for preventing leakage past the piston and which is so designed that the cup washers when worn can be easily removed from the piston and replaced.

Another object of the invention is to provide a piston for slush pumps and the like having a novel and simple form of cup washer.

A further object of the invention is to provide a piston for slush pumps and the like having a metal flange against which cup washers constituting packing elements may be positioned and having a non-metallic ring encircling the flange to prevent the flange from coming in direct contact with the walls of a cylinder, thus preventing any possibility of scoring the cylinder.

With the foregoing and other objects in view, which will be made manifest in the following detailed description, and specifically pointed out in the appended claims, reference is had to the accompanying drawing for an illustrative embodiment of the invention, wherein:

Fig. 1 is a partial view in section through a cylinder, illustrating the improved piston therein in side elevation.

Fig. 2 is a sectional view taken substantially upon the line 2—2 of Fig. 1.

Fig. 3 is a sectional view taken substantially upon the line 3—3 of Fig. 1.

Fig. 4 is a vertical section taken substantially upon the line 4—4 of Fig. 2.

Referring to the accompanying drawing, wherein similar reference characters designate similar parts throughout, the improved piston for slush pumps comprises a piston rod 10 having a shoulder 11 and a threaded end 12 adapted to receive a nut 13. The piston has a body comprising a sleeve 14 constituting a hub adapted to fit around the piston rod between shoulder 11 and nut 13. This sleeve has an outwardly extending integral center flange 15. Cup washers 16 and 17, which are formed of resilient flexible rubber, are positioned against opposite sides of the flange. Each cup washer has a central body portion 18 fitting snugly about sleeve 14 and a laterally extending flange portion 19. The exterior surface of each cup washer is preferably tapered, as shown, so that the flange portion 19 resiliently bears against the walls of the cylinder C. A metal ring 20 is embedded in each cup washer adjacent its outer side, the rubber of the cup washer being vulcanized to the metallic ring. At intervals portions of the body 18 are removed to expose the metallic ring 20, as indicated at 21, providing bearing surfaces for the attaching bolts hereinafter to be mentioned. Surrounding flange 15 there is a ring 22 formed of hard rubber within which there is embedded a metallic reinforcing band 23. The sides of this ring project laterally beyond the sides of the flange 15 and are recessed in the cup washers, as indicated at 24. Attaching bolts 25 extend through the metallic rings 20 and the body portions of the cup washers 16 and 17. The heads of the bolts bear against the exposed portions of the metallic ring 20 in cup washer 17 and correspondingly nuts 26 are tightened against the exposed portions of metallic ring 20 embedded in cup washer 16. The tightening of these attaching bolts compresses the rubber of the cup washers and to a limited extent expands the cup washers into engagement with the walls of the cylinder.

During the reciprocation of the piston pressures which build up on the cup washers expand the flanges 19 against the walls of the cylinder and effectively prevent leakage past the piston. As the cup washers become worn, the hard rubber or nonmetallic ring 22 surrounding the flange 15 prevents the flange from coming in contact with the walls of cylinder C and scoring the walls. When the cup washers have become so worn as to require replacement, nut 13 can be removed and sleeve 14 with its attached parts can be removed as a unit. Nuts 26 can then be removed and the attaching bolts 25 taken out. When these are removed each cup washer can be slipped laterally off of its respective end of sleeve 14 and new cup washers substituted therefor. When they have been thus replaced the sleeve 14 can be again positioned on the piston rod as a complete unit and nut 13 reapplied.

From the above described construction it will be appreciated that the improved piston for slush pumps is a very simple yet durable construction, permitting the cup washers which may become worn to be easily and quickly replaced.

Various changes may be made in the details of construction without departing from the spirit or scope of the invention as defined by the appended claims.

I claim:

1. A piston for slush pumps and the like comprising a piston rod, a sleeve secured to the piston rod, said sleeve having an outwardly extending flange, opposed cup washers detachably secured against opposite sides of the flange, and a ring presenting a non-metallic outer surface encircling the flange for preventing the flange from contacting with cylinder walls.

2. A piston for slush pumps and the like comprising a piston rod, a sleeve secured to the piston rod, said sleeve having an outwardly extending flange opposed cup washers detachably secured against opposite sides of the flange, and a ring presenting a non-metallic outer surface encircling the flange for preventing the flange from contacting with cylinder walls, said ring having a metal band reinforcement embedded therein.

3. A piston for slush pumps and the like comprising a piston rod, a sleeve secured to the piston rod, said sleeve having an outwardly extending flange, opposed cup washers detachably secured against opposite sides of the flange, and a ring presenting a non-metallic outer surface encircling the flange for preventing the flange from contacting with cylinder walls, said ring having its sides projecting laterally beyond the sides of the flange and recessed in the cup washers.

4. A cup washer for slush pump pistons and the like comprising a rubber cup shaped washer, a metal ring embedded therein adjacent its outer side, portions of the ring being exposed on the outer side of the washer to present a bearing surface against which an attaching means may be tightened.

5. A piston for slush pumps and the like comprising a sleeve having a flange, packing means positioned against the flange adapted to engage the walls of a cylinder, and a ring presenting a non-metallic outer surface encircling the flange for preventing the flange from coming in direct contact with the walls of the cylinder, said ring being separate from the packing means.

6. A piston for slush pumps and the like comprising a piston rod, means providing a flanged piston body on the piston rod, opposed rubber cup washers positioned against opposite sides of the flange, each cup washer having a metal reinforcement embedded therein having portions exposed on the outer side of the cup washer, and means extending through the cup washer and reinforcement bearing on the exposed portion of the reinforcement for securing the cup washers to the flange.

7. A piston for slush pumps and the like comprising a piston rod, means providing a flanged piston body on the piston rod, a rubber cup washer positioned against one side of the flange, said cup washer having a metal reinforcement embedded therein having portions exposed on the outer side of the cup washer, and means extending through the cup washer and reinforcement bearing on the exposed portion of the reinforcement for securing the cup washer to the flange.

8. A piston for slush pumps and the like comprising a piston rod, a flanged sleeve on the piston rod, opposed rubber cup washers positioned on opposite sides of the flange, each cup washer having a metal ring embedded therein having portions exposed on the outer side of the cup washer, and means extending through the cup washers and rings bearing on the exposed portion of the rings for securing the cup washers to the flange.

9. A piston for slush pumps and the like comprising a piston rod, a flanged sleeve on the piston rod, opposed rubber cup washers positioned on opposite sides of the flange, each cup washer having a metal ring embedded therein having portions exposed on the outer side of the cup washer, and bolts extending through both cup washers, their rings and the flange; said bolts having heads bearing upon the exposed portions of the ring of one cup washer and having nuts bearing upon the exposed portions of the ring of the other cup washer.

In testimony whereof I have signed my name to this specification.

CLARK L. TYLER.